(12) United States Patent
Kvisteroy et al.

(10) Patent No.: US 8,449,177 B2
(45) Date of Patent: May 28, 2013

(54) VACUUM SENSOR

(75) Inventors: Terje Kvisteroy, Horten (NO); Henrik Jakobsen, Horten (NO)

(73) Assignee: Infineon Technologies AG, Neubiberg (DE)

( * ) Notice: Subject to any disclaimer, the term of this patent is extended or adjusted under 35 U.S.C. 154(b) by 1341 days.

(21) Appl. No.: 12/134,322

(22) Filed: Jun. 6, 2008

(65) Prior Publication Data
US 2008/0304544 A1 Dec. 11, 2008

(30) Foreign Application Priority Data

Jun. 6, 2007 (EP) .................................... 07109730

(51) Int. Cl.
*G01K 7/22* (2006.01)

(52) U.S. Cl.
USPC ............ 374/143; 374/208; 374/163; 374/185

(58) Field of Classification Search
USPC ................. 374/120, 121, 185, 141, 143, 208, 374/100, 4, 5, 45, 54, 55, 57, 29, 39, 44, 374/43, 183, 184, 163; 73/700, 715, 718, 73/25.01, 25.05, 30.01, 30.04, 31.05; 250/338.1, 250/339.02, 339.03, 339.04; 438/51, 54, 438/55, 14, 15, 458; 257/682
See application file for complete search history.

(56) References Cited

U.S. PATENT DOCUMENTS

| 4,262,532 | A | * | 4/1981 | Butler et al. | 374/143 |
|---|---|---|---|---|---|
| 5,347,869 | A | * | 9/1994 | Shie et al. | 73/755 |
| 5,921,461 | A | | 7/1999 | Kennedy et al. | |
| 5,963,782 | A | * | 10/1999 | Webb | 438/15 |
| 6,393,919 | B1 | * | 5/2002 | Ohji et al. | 73/708 |
| 6,495,389 | B2 | * | 12/2002 | Ishio et al. | 438/53 |
| 6,953,716 | B2 | * | 10/2005 | Wong et al. | 438/166 |
| 7,047,810 | B2 | * | 5/2006 | Kogan et al. | 73/702 |
| 7,172,916 | B2 | * | 2/2007 | Jung et al. | 438/48 |
| 7,491,567 | B2 | * | 2/2009 | DCamp et al. | 438/51 |
| 7,493,819 | B2 | * | 2/2009 | Benzel et al. | 73/715 |
| 7,563,635 | B2 | * | 7/2009 | Ikushima et al. | 438/55 |
| 7,572,053 | B2 | * | 8/2009 | De Crecy et al. | 374/5 |
| 7,963,147 | B2 | * | 6/2011 | Jun et al. | 73/31.06 |
| 8,080,797 | B2 | * | 12/2011 | Vogt et al. | 250/338.4 |
| 2001/0022207 | A1 | * | 9/2001 | Hays et al. | 148/518 |
| 2002/0139776 | A1 | * | 10/2002 | Tsuchiya et al. | 216/86 |
| 2005/0000292 | A1 | * | 1/2005 | Muchow et al. | 73/715 |
| 2005/0028580 | A1 | | 2/2005 | Bauer et al. | |

(Continued)

FOREIGN PATENT DOCUMENTS

| DE | 19848362 A1 | * | 4/2000 |
| FR | 2855510 A1 | * | 12/2004 |
| JP | 63299201 A | * | 12/1988 |
| WO | WO2005098386 A | * | 10/2005 |

*Primary Examiner* — Gail Verbitsky
(74) *Attorney, Agent, or Firm* — Eschweiler & Associates, LLC

(57) ABSTRACT

A micro mechanical vacuum sensor for determining the pressure within a cavity of a micro mechanical device is provided. The sensor comprises a substrate, at least one electrically conductive support member connected to the substrate, and a thermally resistive layer supported by the at least one support member and spaced from the substrate by the support member to provide a space between the thermally resistive layer and the substrate. The sensor is arranged such that the thermally resistive layer is substantially thermally insulated from the substrate. The sensor is further arranged to be driven such that the pressure within the cavity is determined by a temperature value sensed by the sensor.

18 Claims, 7 Drawing Sheets

U.S. PATENT DOCUMENTS

| | | |
|---|---|---|
| 2005/0212066 A1 | 9/2005 | Arana et al. |
| 2006/0131501 A1* | 6/2006 | Ikushima et al. ......... 250/338.1 |
| 2006/0134825 A1* | 6/2006 | DCamp et al. ............... 438/106 |
| 2006/0289415 A1* | 12/2006 | Muehlheim et al. ......... 219/209 |
| 2007/0063634 A1* | 3/2007 | Oyaizu et al. ............... 313/496 |
| 2007/0069133 A1 | 3/2007 | DeWames et al. |
| 2007/0074574 A1* | 4/2007 | Kogan et al. ................... 73/702 |
| 2007/0116086 A1* | 5/2007 | Massoni et al. .............. 374/121 |
| 2007/0278605 A1* | 12/2007 | Shibayama .................. 257/432 |
| 2007/0279845 A1* | 12/2007 | Kuhnt et al. .................. 361/679 |
| 2008/0128901 A1* | 6/2008 | Zurcher et al. ................ 257/724 |
| 2008/0164413 A1* | 7/2008 | Shibayama ................ 250/338.4 |
| 2010/0308426 A1* | 12/2010 | Getman et al. ............... 257/419 |
| 2011/0001396 A1* | 1/2011 | Niblock ........................ 310/338 |
| 2011/0018076 A1* | 1/2011 | Pahl et al. .................... 257/415 |
| 2011/0061449 A1* | 3/2011 | Yagi et al. ...................... 73/49.2 |
| 2011/0150030 A1* | 6/2011 | Abdelmoneum et al. .... 374/117 |
| 2011/0156178 A1* | 6/2011 | Zuniga-Ortiz et al. ....... 257/415 |

* cited by examiner

VACUUM SENSOR

CROSS REFERENCE TO RELATED APPLICATIONS

This application claims priority under 35 U.S.C. §119 to Application No. EP 07109730.7 filed on Jun. 6, 2007, entitled "Vacuum Sensor," the entire contents of which are hereby incorporated by reference.

FIELD OF THE INVENTION

The present invention relates to a vacuum sensor. In particular, the invention relates to a vacuum sensor arranged to sense a vacuum level within a micro mechanical device.

BACKGROUND

Many micro electromechanical system (MEMS) devices require reliable vacuum volumes in order to obtain the best possible functionality and high reliability. Examples of such MEMS devices are bolometers for infrared (IR) sensing, resonant structures, and absolute pressure sensors. In general, low pressure is necessary to obtain high Q-factors in resonant structures, and is also needed in IR bolometers to obtain low noise.

The sealing of cavities, that contain the components of such systems, under vacuum typically results in pressures in the cavities in the range 1-10 mBar. However, the residual gas pressure in a hermetically sealed cavity depends on several factors, including the temperature and the materials used in the sealing process. In order to obtain reliable pressures below 1 mBar, gettering methods are usually required. It is extremely difficult, however, to obtain and maintain a suitable and reliable vacuum in MEMS devices.

For most micro system devices requiring a vacuum the disadvantages of implementing a separate vacuum sensor have been considered so critical that no such sensor has been part of the final product, even in devices where vacuum quality is paramount. In most cases, as the measurement of the actual pressure inside the cavity is cumbersome, expensive and indirect, the pressure is simply not known. The provision of a low cost but accurate vacuum sensor for MEMS devices is therefore required in the field of MEMS technology.

The implementation of a vacuum sensor into the cavity has been attempted; however, this can degenerate the vacuum level due to out-gassing from applied materials. Known devices generally utilize some sort of diaphragm (for isolation) with integrated resistive heaters and thermistor materials. In most cases these structures are both fairly large and not very well thermally isolated. They also require a particular design, often in conflict with, strongly influencing, or adding to the cost of the primary device that requires the vacuum cavity. Additionally, the thermal coefficient of resistance (TCR) of the thermistor material is not optimal in many cases, typically being in the range of −0.2 to −0.3%/K. Therefore, there exists a need to provide light-weight, compact and accurate vacuum sensors at low cost, the implementation of which causes minimal disruption to the structure, manufacture and working of the MEMS device.

SUMMARY

According to the present invention there is provided a micro mechanical vacuum sensor for determining the pressure within a cavity of a micro mechanical device, the sensor comprising a substrate; at least one electrically conductive support member connected to the substrate; and a thermally resistive layer supported by the at least one support member and spaced from the substrate by the support member to provide a space between the thermally resistive layer and the substrate, the sensor being arranged such that the thermally resistive layer is substantially thermally insulated from the substrate, wherein the sensor is arranged to be driven such that the pressure within the cavity is determined by a temperature value sensed by the sensor.

The invention is particularly suitable for, but not limited to, use in IR bolometers, where the thermally insulated bolometer structure itself can be used both as a heater and as a temperature sensor during the manufacture of the bolometer sensor or throughout the operating life of the sensor, to measure actual vacuum levels.

Such a sensor is simple to implement in existing MEMS devices or to incorporate into the manufacture of such devices, being inexpensive and advantageously being constructed from components that are already part of the MEMS device. For example, the sensing structures of the invention can be built together with IR bolometer devices by using the same material system and the same process sequence, and only with minor modification to the structure or layout of the device to allow the resistive vacuum gauge structure(s) to interfere with the surrounding gas (vacuum).

The aim of the present invention is to build a vacuum sensor into a small cavity using thin-film technology and to build a thermally insulated structure that can be heated by resistive heating without heating up the other parts inside the cavity and the seal ring thereof. The same insulated resistive structure can be used as a temperature sensor to measure the actual heat transfer due to the residual gas. In particular, bolometer materials like SiGe quantum well compositions are known to have a thermal coefficient of resistance (TCR) in the order of +3%/K.

BRIEF DESCRIPTION OF THE DRAWINGS

Examples of the present invention will now be described in detail with reference to the accompanying drawings in which.

DETAILED DESCRIPTION

The present invention uses a conventional thermally conductive resistance thermometer or thermistor (if formed from a semiconductor material) technique to create a vacuum gauge for measuring vacuum level and/or change of vacuum level.

When the pressure of a gas becomes low enough, the mean free path of the molecules is large compared with the pertinent dimensions of the device. This results in a linear relation between the pressure and the thermal conductivity. For a thermal conductivity gauge the pertinent dimension is the spacing between the hot surface (the heated structure) and the cold surface (the walls of the device; walls of the vacuum cavity). For reasonable micro device designs the applicable range will be from typically $1 \times 10^{-3}$ mBar to 10 mBar.

Most thermal conductivity gauges utilize a heated element with a constant energy input. This element assumes an equilibrium temperature when heat input and losses by conduction and radiation are balanced. This temperature becomes a measure of pressure and is measured by the gauge.

The most common types of known thermal conductivity gauges are thermocouples or resistance thermometers (Pirani). If the resistance element in a resistance thermometer is made of a semiconductor material the gauge is called a thermistor type. In the resistance thermometer the function of heating and temperature measurement are combined in a single element. Two or four reference elements can be combined in a half or full Wheatstone bridge configuration, respectively. In practice, the gauge can measure changes in pressure through the temperature measurement, and in this case an absolute measurement will rely upon some form of calibration.

Figure 1:
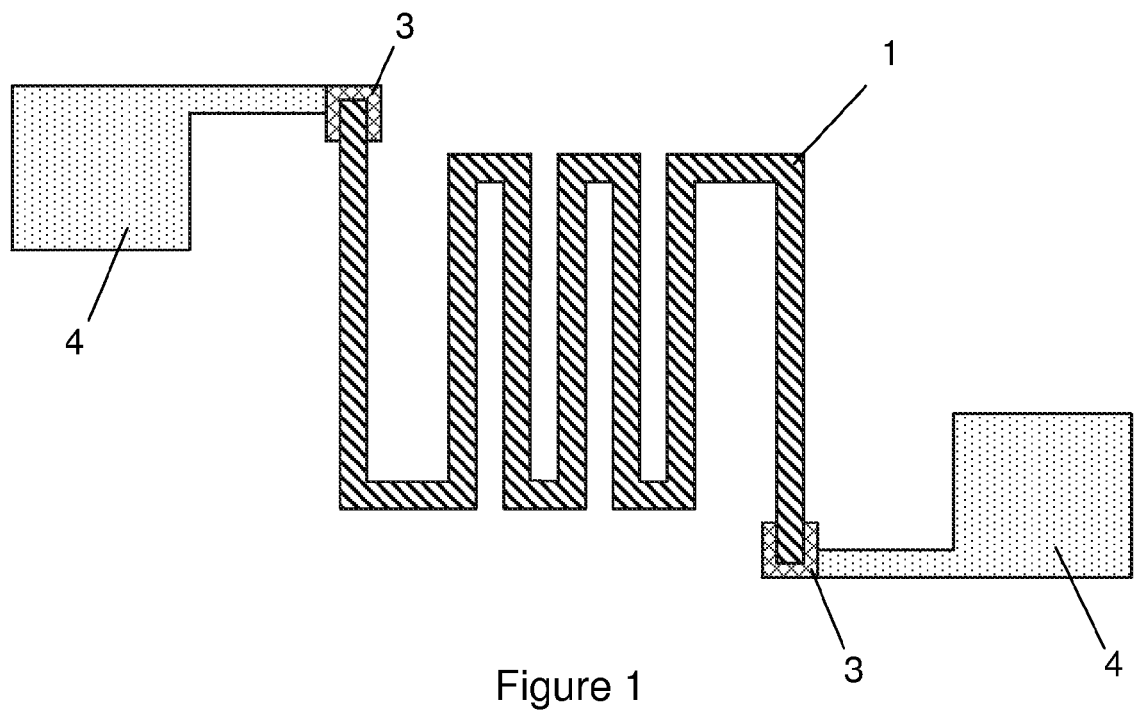
FIG. 1 shows a plan view of a first type of a first embodiment of a vacuum sensor, having a thin-film thermally resistive layer, according to the present invention.
Figure 2:
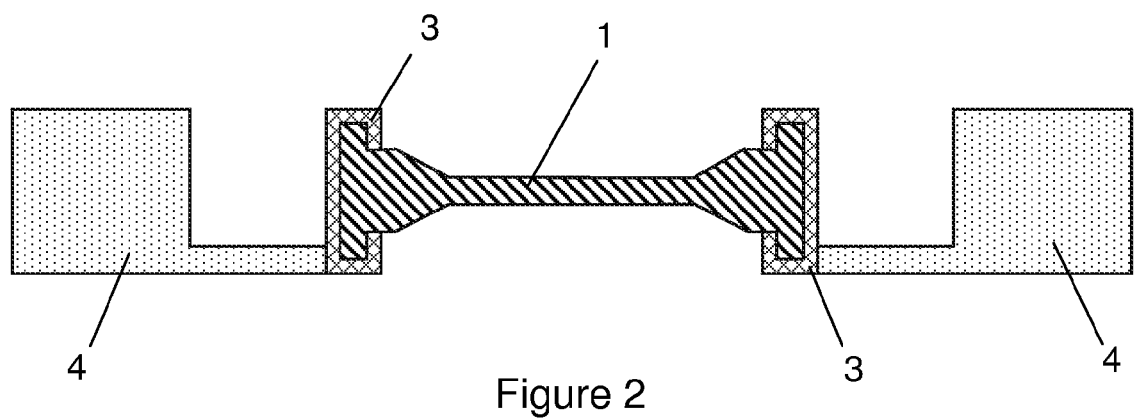
FIG. 2 shows a plan view of a second type of the first embodiment of the vacuum sensor according to the present invention.
Figure 3:
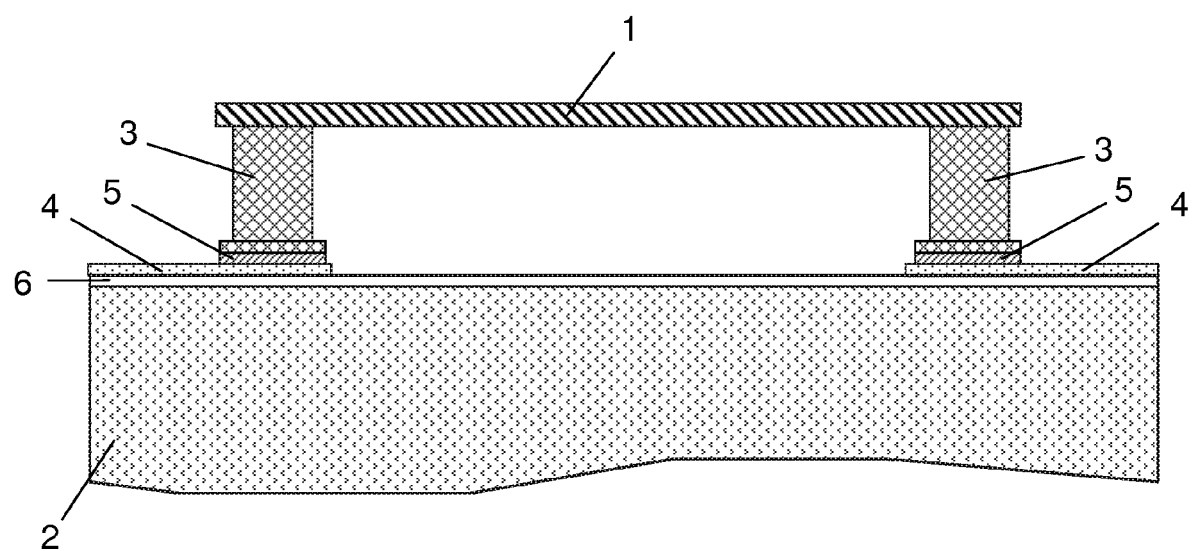
FIG. 3 shows a cross-sectional side view of the first embodiment of the vacuum sensor.

FIGS. 1 to 3 show a first type of a vacuum sensor, having a thin-film thermally resistive (or thermistor) layer, according to the present invention. The structure is raised or spaced from the surface of a silicon substrate 2 and suspended on electrically conductive support legs 3.

The preferred design of the thermistor layer 1 depends on a number of factors, such as the stability of the structure, the amount of thermistor material required, the method of manufacture, etc. FIG. 1 shows a plan view of a meandering, winding or serpentine thermistor design, in which a number of turns are provided in the thermistor layer 1 in order to provide a maximum length of thermistor material over a relatively short distance in a compact device. One or more of the turns can also be zig-zagged or curved depending on the above factors. FIG. 2 shows a plan view of a fuse type design in which a straight portion of thermistor material is provided in a secure and direct thermistor layer 1.

The thermistor material is formed of any of a large variety of thin-film materials having a reasonably high thermal coefficient of resistance, for example, chromium, silicon, molybdenum, nickel, titanium, tantalum, tungsten or conducting alloys, mixed semi-conducting materials, or quantum well materials such as SiGe single crystal thermistor material. The resistive material can also be platinum (Pt) or alternatively titanium (Ti).

The substrate 2 is preferably formed from one of silicon, glass and ceramic.

In order to be well-lifted over the substrate, the conductive legs 3 can be formed of gold (Au), copper (Cu) or other materials that can be suitably plated. They are typically formed from thicker electrically conductive films made by selective plating (nickel, copper or gold), for example by using a photo-resist mask and a thin seed-layer. Conventional thin-film processes and standard photolithographic methods can also be used. The conductive legs 3 are preferably made relatively long and thin, and with an overall relatively small volume, for optimum low thermal conductance. The legs 3 preferably comprise wider base posts of a similar material, as shown in FIG. 3, to ensure stability and allow an efficient electrical connection. It will be appreciated that a single leg having two separate electrical contacts could be provided. FIG. 3 shows a cross-sectional side view of a vacuum sensor according to the invention, and could represent such a view of the sensor of either of FIG. 1 or 2, as the vacuum sensor is preferably substantially flat in the horizontal plane as viewed in FIG. 3, in order to provide increased stability and for ease of manufacture.

A thin-film electrically conductive layer 4 is formed on the silicon substrate to provide conduction paths to the conductive legs 3. Each electrically conductive (typically metal) layer or path 4 can be formed from gold (Au), silver (Ag), aluminium (Al), or copper (Cu), or can be formed integrally with the mechanical support legs 3 from, for example, titanium (Ti).

As shown in FIG. 3, a diffusion barrier material layer 5 is provided between the conductive legs 3 and the conductive layer 4. Additionally, a passivation layer is formed between the conductive layer 4 and the substrate 2.

A space is created between the substrate 2 and the thermistor layer 1, the space contributing to the thermal insulation of the structure.

Figure 4:
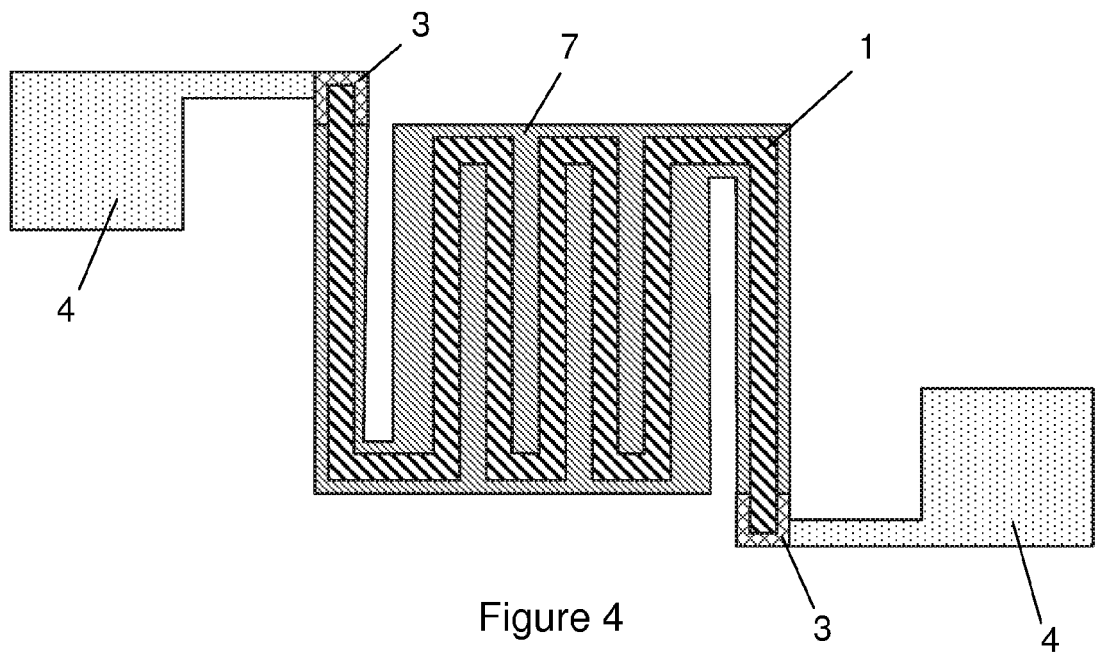
FIG. 4 shows a plan view of a second embodiment of a vacuum sensor, having a thin-film thermally resistive layer supported by an electrically insulating support platform, according to the present invention.
Figure 5:
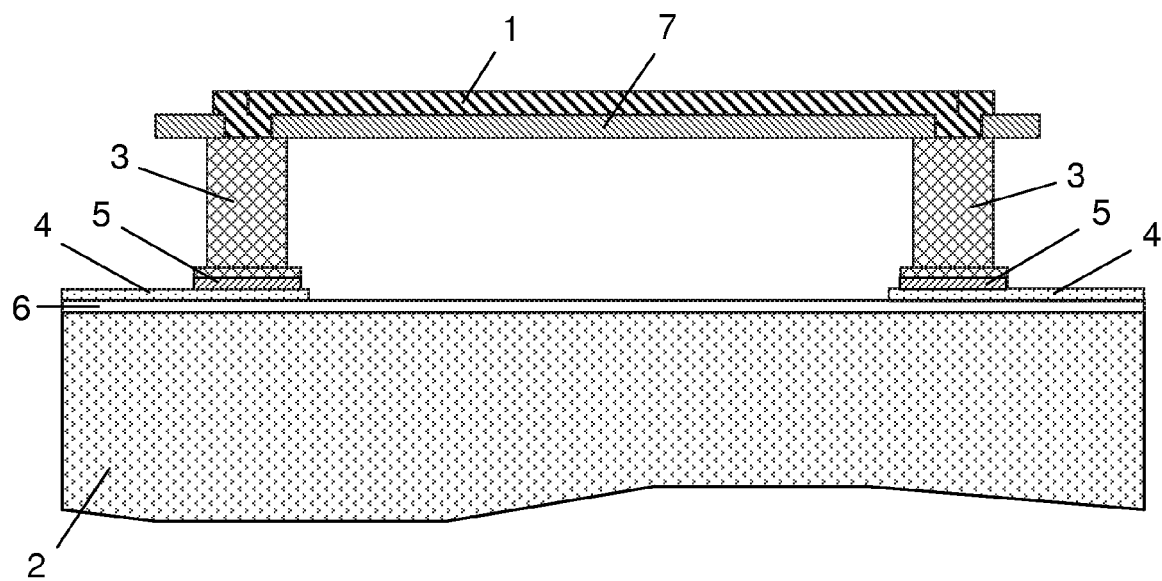
FIG. 5 shows a cross-sectional side view of the vacuum sensor of FIG. 4.

FIGS. 4 and 5 show a second type of vacuum sensor, having a thin-film thermistor layer 1, according to the present invention. The sensor has a similar structure to that of FIGS. 1 to 3. However, as shown in the plan view of FIG. 4 and the cross-sectional side view of FIG. 5, the thermistor layer 1 is supported by an electrically insulating thin-film support platform 7 provided below the thermistor layer 1. Such a support platform 7 provides added stability to the spaced thermistor layer 1. The platform is preferably formed from silicon nitride (SiN).

Figure 6:
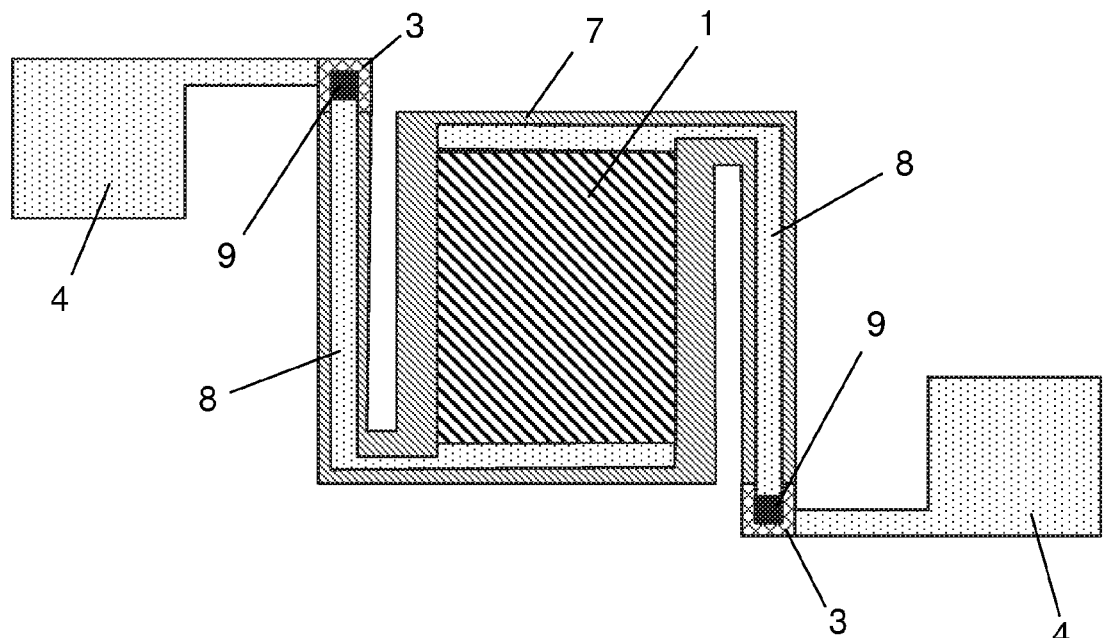
FIG. 6 shows a plan view of a third embodiment of a vacuum sensor, having electrical connection means between the thermally resistive layer and the conductive legs of the sensor, according to the present invention.
Figure 7:
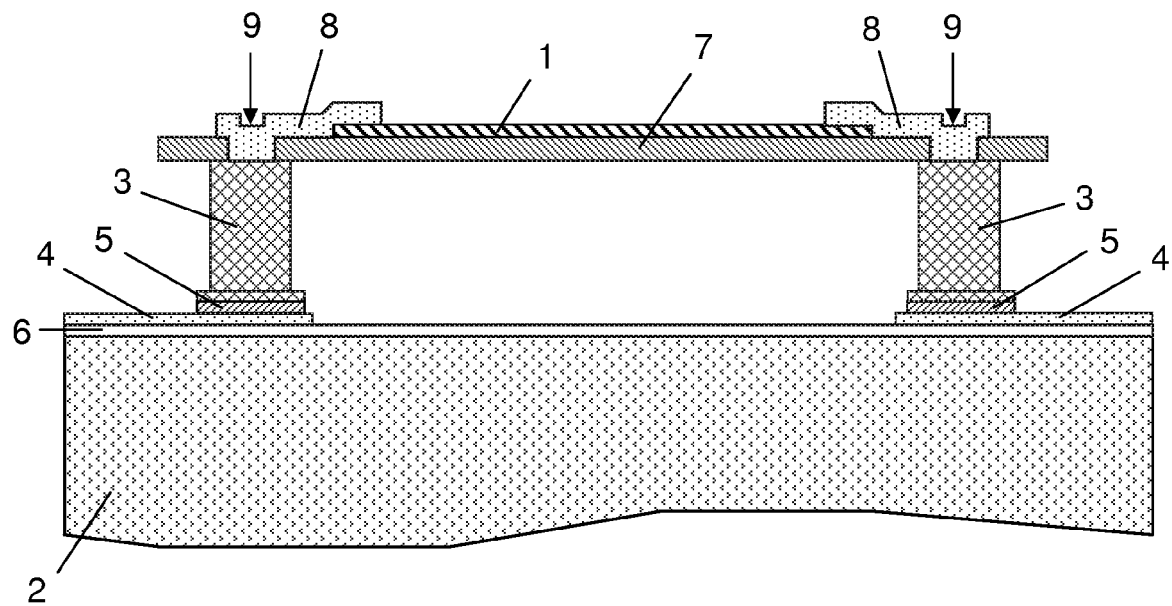
FIG. 7 shows a cross-sectional side view of the vacuum sensor of FIG. 6.

FIGS. 6 and 7 show a third type of vacuum sensor according to the present invention. The sensor has a similar structure to that of FIGS. 1 to 5. However, in this case an electrical connector 8 is provided on the electrically conductive legs 3 and extends over the insulating support platform 7 to contact the thermistor layer 1. As shown in the plan view of FIG. 6, contact holes 9 are provided for electrical connection. In this embodiment, electrical connection between the thermistor layer 1 and the conductive legs 3 is achieved irrespective of the volume of thermistor material used, the shape of the thermistor layer 1, the positioning of the thermistor material on the support platform 7, or the positioning of and distance between the conductive legs 3. For example, FIG. 6 shows a simple rectangle of thermistor material positioned on the support platform 7, which is then placed in electrical contact with the conductive legs 3 via the subsequent provision of the electrical connector 8 between the thermistor layer 1 and the conductive legs 3. This arrangement simplifies the manufacturing process without compromising the efficiency of the sensor.

The micro mechanical device in which the sensor is employed has a sealed cavity in which a vacuum is ideally created during or after manufacture of the structure, for example through the use of a getter material.

Figure 8:
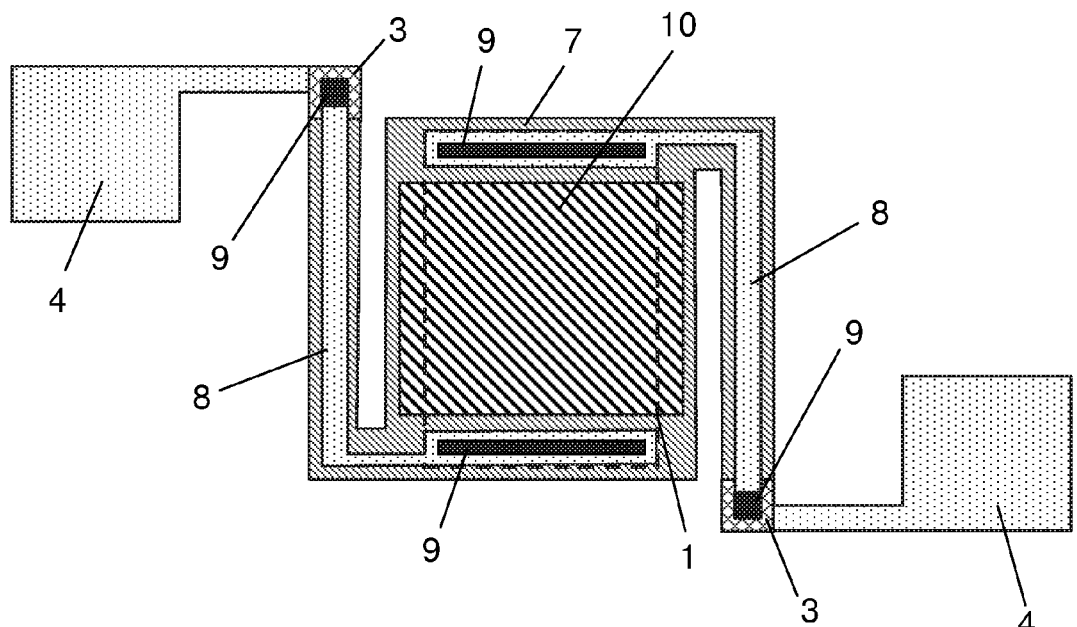
FIG. 8 shows a plan view of a fourth embodiment of a vacuum sensor, having a thin-film getter, the thermally resistive layer being built into the electrically insulating support platform, according to the present invention.
Figure 9:
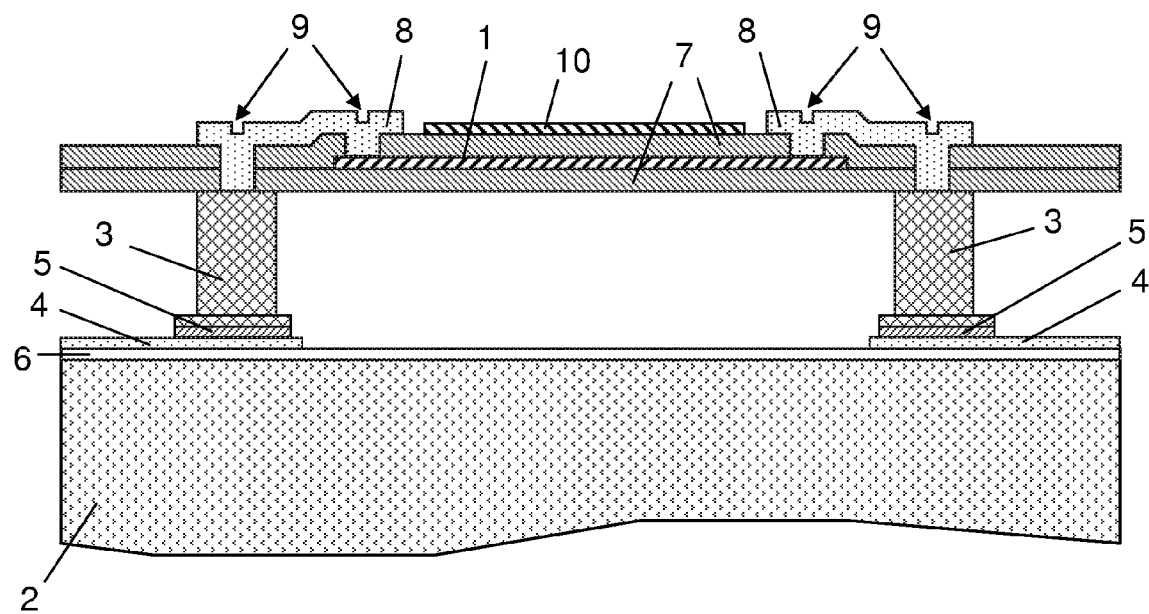
FIG. 9 shows a cross-sectional side view of the vacuum sensor of FIG. 8.

FIGS. 8 and 9 show a fourth type of vacuum sensor according to the present invention. The sensor has a similar structure to that of FIGS. 1 to 7. However, as shown in the plan view of FIG. 8 and the cross-sectional side view of FIG. 9, a thin-film getter layer 10 is provided and the thermistor layer 1 is buried into the insulating platform.

The getter material can be, for example, titanium, a titanium-containing alloy or any other thin-film material that reacts with the residual gas and forms stable oxides on the surface thereof.

Therefore, a thermally resistive structure can be built in a bolometer process by using the bolometer thermistor material layer 1 for heating and sensing, and providing layers of electrically insulating materials 7 (such as silicon nitride and/or silicon dioxide) to provide mechanical rigidity for the legs 3. For example, in FIG. 9 the upper layer can be formed of silicon nitride (SiN) while the lower layer can be formed of silicon dioxide ($SiO_2$). An additional thermally isolating layer can rest between a lower layer of, for example, aluminum (not shown), and the layer of thermistor material 1. A further example of this concept is shown in FIG. 5, in which the silicon nitride layer 7 extends over the legs 3 to support the layer of thermistor material 1.

Furthermore, the use of the thermally resistive structure as a vacuum sensor (via temperature measurement and the inferred pressure measurement within the cavity), allows the gettering to be monitored and controlled in accordance with the pressure inside the cavity through resistive heating of the thermistor material.

The supportive layer 7 of FIGS. 4 to 9 is advantageous since the silicon nitride is relatively strong and at the same time has low thermal conductance. It is therefore possible to make the electrical connection to the thermistor structure comparatively thinner and longer, thereby providing the electrical conductor system with a relatively long and thin thermal conduction path.

Figure 10:
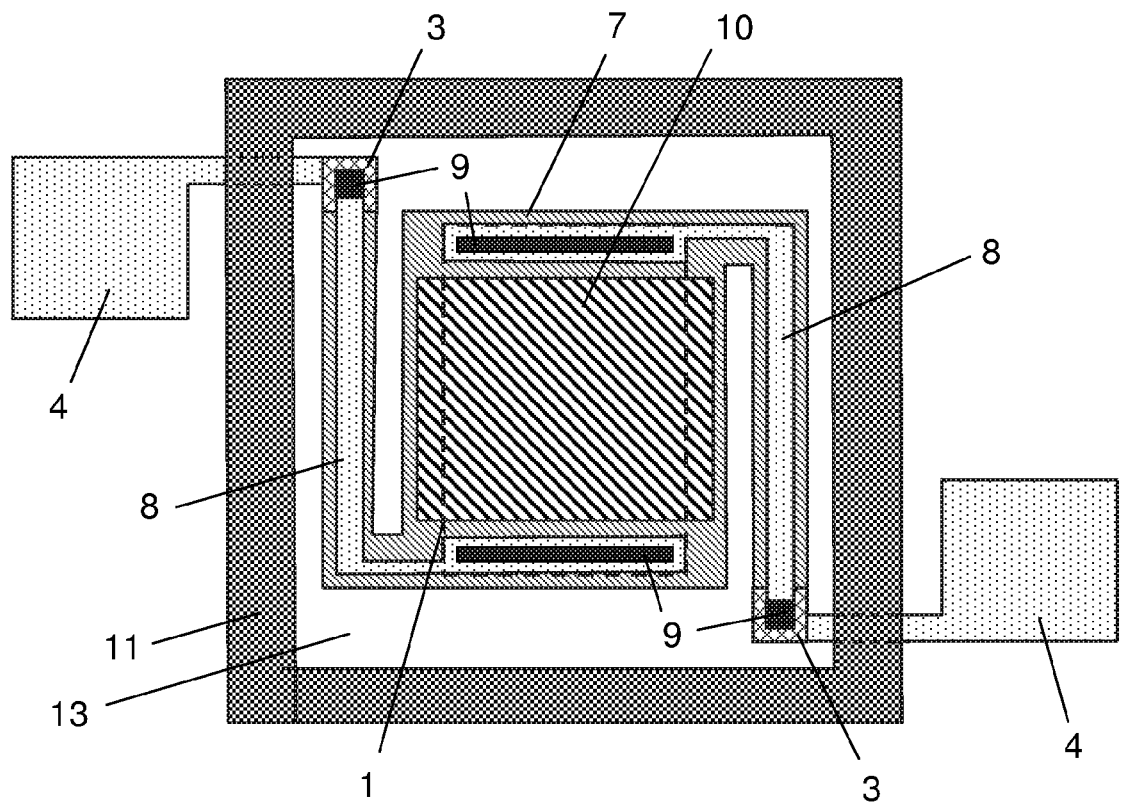
FIG. 10 shows a plan view of the vacuum sensor of FIGS. 8 and 9 having a seal-ring and a covering that define a sealed cavity.
Figure 11:
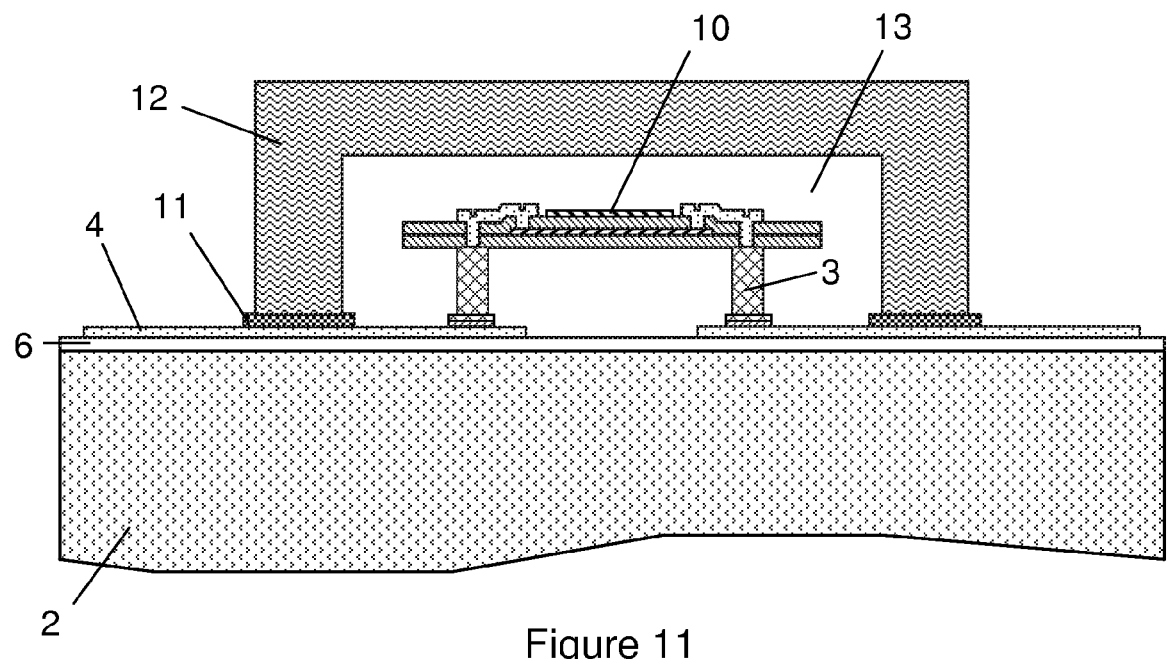
FIG. 11 shows a cross-sectional side view of the vacuum sensor of FIG. 10.

FIGS. 10 and 11 show plan and cross-sectional side views, respectively, of the vacuum sensor of FIGS. 8 and 9 having a seal-ring 11 and a covering or lid 12. The seal-ring is arranged to hermetically seal the lid 12 in order to build the vacuum sensor into a sealed cavity or microcavity 13.

Figure 12:
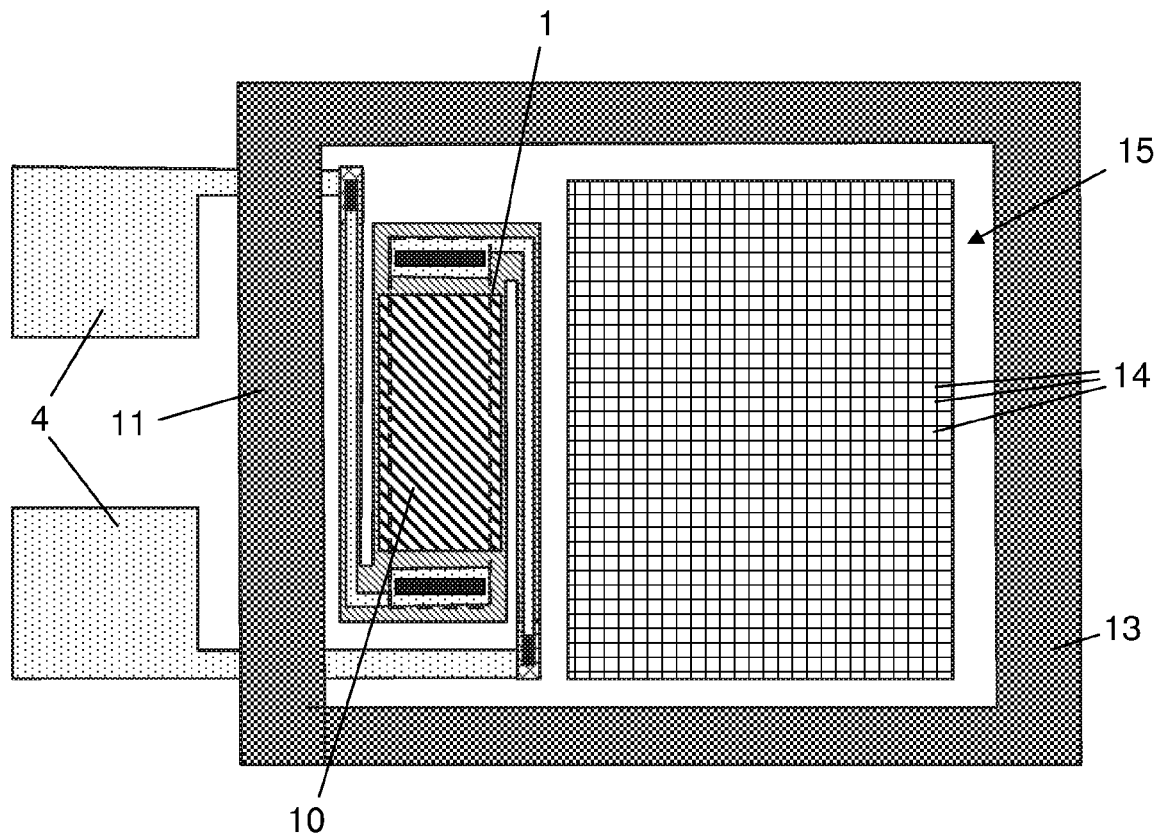
FIG. 12 shows a plan view of a vacuum sensor according to the present invention in which the sensor is sealed, together with a plurality of infrared bolometer detector pixels, inside a microcavity.
Figure 13:
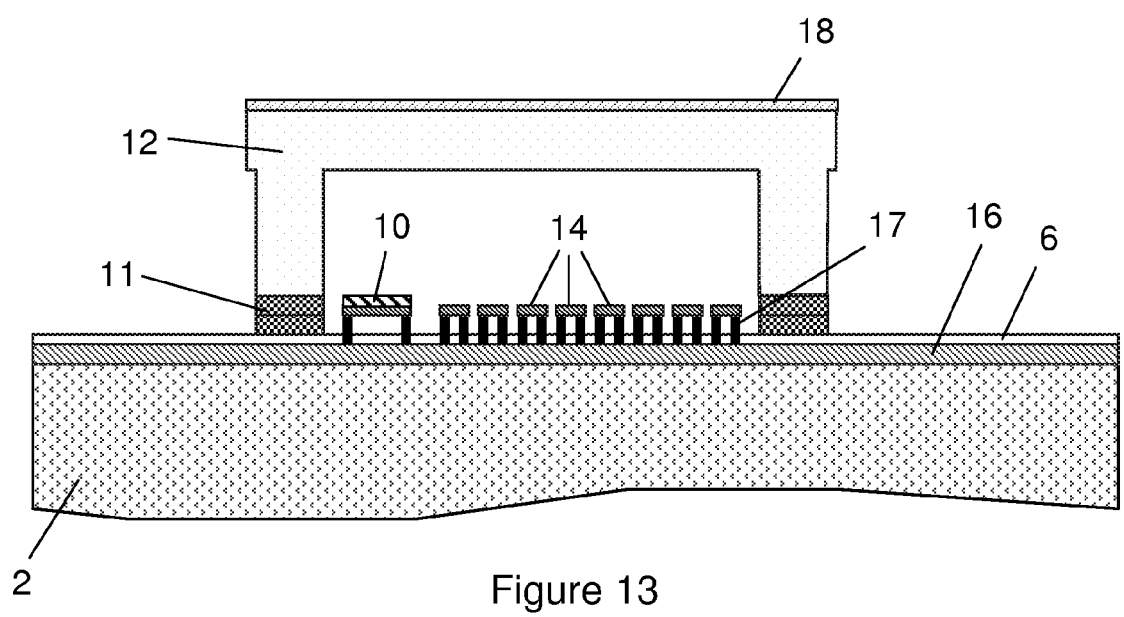
FIG. 13 shows a cross-sectional side view of the vacuum sensor of FIG. 12.

One device in which makes use of the formation of a cavity and in which the invention may be advantageous is a bolometer. FIGS. 12 and 13 show an implementation of the invention in which the vacuum sensor is arranged together with a plurality of infrared (IR) bolometer detector pixels 14 arranged to form an IR detector pixel area 15. As shown in the plan view of FIG. 12 and the cross-sectional side view of FIG. 13, the integrated resistive thermistor structure and bolometer pixels 14 can be sealed inside a microcavity 13. The IR detector pixels are connected to an integrated circuit area 16 by interconnects 17 which are disposed in the passivation layer 6, as shown in FIG. 13. An IR coating 18 is applied to the covering or lid 12. The lid is preferably formed of silicon, which is etched to provide the shape of the cavity as required.

It should be understood that the present invention is not limited to implementation on the wafer level, and that the example of FIGS. 12 and 13 is one of many ways of realizing the invention.

This invention provides thermally resistive structures that are thermally insulated from the substrate they are built on. It is also possible to make the thermal structures extremely small. Heating of the structure is therefore possible without heating other parts inside the device. The sensor also allows sensing without additional heating of the structure from other parts inside the device. The response time, as well as the sensitivity and noise level of the vacuum sensor, can be optimized owing to the small size and high TCR of the present invention.

The isolated thin-film thermally resistive structures can be placed directly on passivated silicon surfaces, ceramic surfaces or glass.

For other devices that are similar to bolometer devices, this solution, using the same (thermistor) structures and materials as for the bolometer device, offers a low cost and practical way of implementing vacuum measurement and control into any such device.

Two alternative methods can be used for manufacturing:
(a) a combination of thin-film technology and sacrificial layer etching.
(b) a combination of thin-film technology, wafer transfer technology and sacrificial layer etching.

By using these known techniques, thermally resistive structures can be built onto a large variety of devices that contain small vacuum cavities, including directly on top of CMOS.

A generic device will typically consist of a resistive layer, one or more insulating layer(s), and an electrically conductive layer that forms either part of the legs or the complete legs that lift the structure over the substrate.

One example is to use a thin layer of platinum as resistive layer, however other thin-film conducting or semi-conducting materials can be used.

More specifically, the structures can be built together with IR bolometer devices by using the same material system and the same process sequence, and only with minor modification to the structure or layout of the device to allow the resistive vacuum gauge structure(s) to interfere with the surrounding gas (vacuum).

What is claimed is:

1. A micro mechanical vacuum sensor for determining the pressure within a cavity of a micro mechanical device, the sensor comprising:
   a semiconductor substrate;
   at least one electrically conductive support member connected to the semiconductor substrate; and
   a thermally resistive layer supported by the at least one electrically conductive support member and spaced from the semiconductor substrate by the at least one electrically conductive support member to provide a space between the thermally resistive layer and the semiconductor substrate, the sensor being arranged such that the thermally resistive layer is substantially thermally insulated from the semiconductor substrate, wherein the sensor is configured to be driven such that the pressure within the cavity is determined by a temperature value sensed by the sensor.

2. The micro mechanical vacuum sensor according to claim 1, wherein the thermally resistive layer is heated by resistive heating.

3. The micro mechanical vacuum sensor according to claim 1, wherein the thermally resistive layer comprises platinum (Pt), titanium (Ti), or SiGe single crystal thermistor material.

4. The micro mechanical vacuum sensor according to claim 1, further comprising: an electrically conductive component arranged to electrically connect the at least one electrically conductive support member to the semiconductor substrate.

5. The micro mechanical vacuum sensor according to claim 1, wherein the thermally resistive layer is supported by at least one electrically insulating layer.

6. The micro mechanical vacuum sensor according to claim 5, wherein the at least one electrically insulating layer comprises silicon nitride (SiN) or silicon dioxide ($SiO_2$).

7. The micro mechanical vacuum sensor according to claim 5, wherein the thermally resistive layer is buried in the at least one electrically insulating layer.

8. The micro mechanical vacuum sensor according to claim 1, further comprising: an electrical connector arranged to connect the thermally resistive layer to the at least one electrically conductive support member.

9. The micro mechanical vacuum sensor according to claim 1, further comprising a getter material arranged over the thermally resistive layer.

10. The micro mechanical vacuum sensor according to claim 9, wherein the getter material comprises titanium (Ti).

11. The micro mechanical vacuum sensor according to any claim 1, wherein the semiconductor substrate comprises at least one of silicon, ceramic, and glass.

12. The micro mechanical vacuum sensor according to claim 1, further comprising: a seal-ring and a covering that are connected to the semiconductor substrate, such that the thermally resistive layer is sealed in a cavity.

13. The micro mechanical vacuum sensor of claim 1, wherein the thermally resistive layer is spaced from the semiconductor substrate by a distance that is substantially equal to a height of the at least one electrically conductive support member.

14. The micro mechanical vacuum sensor of claim 1, wherein the at least one electrically conductive member comprise a base having a width that is greater than a width of a remainder of the at least one electrically conductive support member.

15. The micro mechanical vacuum sensor of claim 1, further comprising:
   a thin-film electrically conductive layer disposed above the semiconductor substrate;
   a diffusion barrier material layer disposed between the thin-film electrically conductive layer and the at least one electrically conductive support member; and
   a passivation layer disposed between the thin-film electrically conductive layer and the semiconductor substrate.

16. An infrared bolometer device, comprising:
   a semiconductor substrate;
   a vacuum sensor comprising:
      at least one electrically conductive support member connected to the semiconductor substrate;
      a thermally resistive layer supported by the at least one electrically conductive support member and spaced from the semiconductor substrate by the at least one electrically conductive support member to provide a space between the thermally resistive layer and the semiconductor substrate, the sensor being arranged such that the thermally resistive layer is substantially thermally insulated from the semiconductor substrate, wherein the sensor is configured to be driven such that the pressure within the cavity is determined by a temperature value sensed by the sensor; and
   one or more bolometer devices disposed on the semiconductor substrate and configured to detect infrared radiation.

17. The infrared bolometer device according to claim 16, further comprising a plurality of infrared bolometer detector pixels.

18. A micro mechanical vacuum sensor for determining the pressure within a cavity of a micro mechanical device, the sensor comprising:
   a substrate;
   at least one electrically conductive support member connected to the substrate;
   a thermally resistive layer supported by the at least one electrically conductive support member and spaced from the substrate by the at least one electrically conductive support member to provide a space between the thermally resistive layer and the substrate, the sensor being arranged such that the thermally resistive layer is substantially thermally insulated from the substrate, wherein the sensor is configured to be driven such that the pressure within the cavity is determined by a temperature value sensed by the sensor; and
   a seal-ring and a covering that are connected to the substrate and which enclose the cavity, such that the thermally resistive layer is sealed in the cavity.

* * * * *